(12) United States Patent
Hagland

(10) Patent No.: US 11,477,610 B2
(45) Date of Patent: Oct. 18, 2022

(54) GAMING LOCATION PRE-EMPTIVE LOSS CORRECTION

(71) Applicant: Sony Interactive Entertainment Inc., Tokyo (JP)

(72) Inventor: Torgeir Hagland, Santa Ana, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 79 days.

(21) Appl. No.: 16/886,708

(22) Filed: May 28, 2020

(65) Prior Publication Data

US 2021/0377696 A1 Dec. 2, 2021

(51) Int. Cl.
*H04W 4/029* (2018.01)
*A63F 13/216* (2014.01)
(Continued)

(52) U.S. Cl.
CPC ........... *H04W 4/029* (2018.02); *A63F 13/216* (2014.09); *A63F 13/35* (2014.09); *G01S 19/42* (2013.01); *H04W 4/027* (2013.01); *H04W 4/20* (2013.01)

(58) Field of Classification Search
CPC ....... H04W 4/38; H04W 4/029; H04W 40/18; H04W 40/20; H04W 4/021; H04W 4/025;
(Continued)

(56) References Cited

U.S. PATENT DOCUMENTS 9,984,505 B2 * 5/2018 Rimon ................. G06F 3/017
10,773,168 B2 * 9/2020 Rodgers ............... A63F 13/493
(Continued)

FOREIGN PATENT DOCUMENTS

GB 2481715 A 1/2012

OTHER PUBLICATIONS

PCT/US2021/034217, Notification of Transmittal of the International Search Report and the Written Opinion of the International Searching Authority, or the Declaration, PCT/ISA/220, and the International Search Report, PCT/ISA/210, dated Sep. 20, 2021.

*Primary Examiner* — Liton Miah
(74) *Attorney, Agent, or Firm* — Penilla IP, APC

(57) ABSTRACT

Methods and systems are provided for providing preemptive actions for predicted data loss during connected gaming using mobile client devices. One example method includes receiving, by a server, data loss from a plurality of mobile client devices. The data loss is used to construct a data loss map that indicates connection quality between said plurality of mobile client devices to the server. The connection quality identifying geolocation data for said plurality of mobile client devices for constructing and updating said data loss map. The method includes receiving, by the server, navigation data for a mobile client device while streaming gameplay from the server. The navigation data is used to identify a route of travel for said mobile client device. The method includes identifying, by the server, a predicted data loss event for the mobile device client. The predicted data loss event is identified using the data loss map and tracking movement of said mobile device client along the route of travel. The method includes sending, by the server, notification data for the predicted data loss event to the mobile client device. The notification data is used for adjusting activity of said gameplay at the mobile client device before reaching a geo-location associated with the predicted data loss event.

19 Claims, 9 Drawing Sheets

(51) Int. Cl.
*A63F 13/35* (2014.01)
*G01S 19/42* (2010.01)
*H04W 4/02* (2018.01)
*H04W 4/20* (2018.01)

(58) Field of Classification Search
CPC ........ H04W 4/20; A63F 13/216; A63F 13/35; G01S 19/42
See application file for complete search history.

(56) References Cited

U.S. PATENT DOCUMENTS

| | | | |
|---|---|---|---|
| 11,058,948 B1* | 7/2021 | Hardiman | A63F 13/497 |
| 2009/0245118 A1 | 10/2009 | McCormick | |
| 2011/0213628 A1* | 9/2011 | Peak | G06Q 40/08 |
| | | | 705/4 |
| 2015/0256581 A1 | 9/2015 | Kolhi et al. | |
| 2016/0241896 A1* | 8/2016 | Phillips | H04N 21/4882 |
| 2017/0279914 A1* | 9/2017 | Bishop | H04L 65/4084 |
| 2017/0374116 A1* | 12/2017 | Phillips | H04W 4/029 |
| 2018/0007109 A1 | 1/2018 | Kolhi et al. | |
| 2018/0272235 A1* | 9/2018 | Lee | A63F 13/69 |
| 2020/0245557 A1* | 8/2020 | Reinecke | G06F 16/248 |
| 2020/0364507 A1* | 11/2020 | Berry | G06N 3/0445 |

* cited by examiner

GAMING LOCATION PRE-EMPTIVE LOSS CORRECTION

FIELD OF THE DISCLOSURE

The present disclosure relates generally to method for predicting data loss for mobile client devices engaged in game streaming, and method for providing preemptive actions to avoid loss in game data.

DESCRIPTION OF THE RELATED ART

Cloud gaming and online gaming has been gaining in popularity in recent years, as bandwidth has increased sufficiently to allow better experiences in mobile settings. Such gaming applications allow, for example, players to use mobile client devices to access servers and streamed games to their devices. This provides for increased flexibility in the location where gamers can play. This flexibility, however, introduces new issues regarding connectivity. As is well known, the connection quality will change depending on where the user is accessing the server using a wireless network.

Wireless networks utilize a combination of cell towers and other communication bases to maintain client device is connected to servers. These wireless networks, for example, provide the connectivity for making phone calls and accessing connected applications utilizing smart phones, tablets and other mobile devices. As more games have been made available for mobile client devices, there is also the challenge of making games more efficient at utilizing available wireless connection bandwidths. There is a balance between how rich and interactive the games can be when accessing from mobile devices, as this tends to increase the amount of data required to be sent for proper game interactivity. At the same time, mobile devices by their very nature are mobile, and the connection capability will change depending on where players are located.

A problem with this construction is that players are often confronted with data loss, game interruption, or inability to complete gaming interactivity when the loss occurs. Additionally, users of such mobile devices will not know when they are entering or approaching an area where data loss will occur.

It is in this context that implementations of the disclosure arise.

SUMMARY

Implementations of the present disclosure include devices, methods and systems relating to ways of handling preemptive loss correction, to anticipate upcoming data loss when mobile client devices are moving about geolocations and are engaged in gaming that requires connection to a server.

In one embodiment, methods are provided for generating preemptive actions for predicted data loss that may occur during connected gaming using mobile client devices. One example method includes receiving, by a server, data loss from a plurality of mobile client devices. The data loss is used to construct a data loss map that indicates connection quality between said plurality of mobile client devices to the server. The connection quality identifying geolocation data for said plurality of mobile client devices for constructing and updating said data loss map. The method includes receiving, by the server, navigation data for a mobile client device while streaming gameplay from the server. The navigation data is used to identify a route of travel for said mobile client device. The method includes identifying, by the server, a predicted data loss event for the mobile device client. The predicted data loss event is identified using the data loss map and tracking movement of said mobile device client along the route of travel. The method includes sending, by the server, notification data for the predicted data loss event to the mobile client device. The notification data is used for adjusting activity of said gameplay at the mobile client device before reaching a geo-location associated with the predicted data loss event.

In some embodiments, notification data is processed by the mobile client to provide a warning to a user of the mobile client device to make a change to said streaming gameplay to avoid data loss.

In some embodiments, the change to said streaming gameplay includes saving a game state before loss of connection.

In some embodiments, the change to said streaming gameplay includes reducing a bandwidth of a connection between the server and the mobile device client.

In some embodiments, the change to said streaming gameplay includes increasing forward error correction for data received from said server during said streaming gameplay.

In some embodiments, the change to said streaming gameplay includes pausing said gameplay if said data loss is a complete loss in connection between the server and the mobile client device.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

Figure 1:
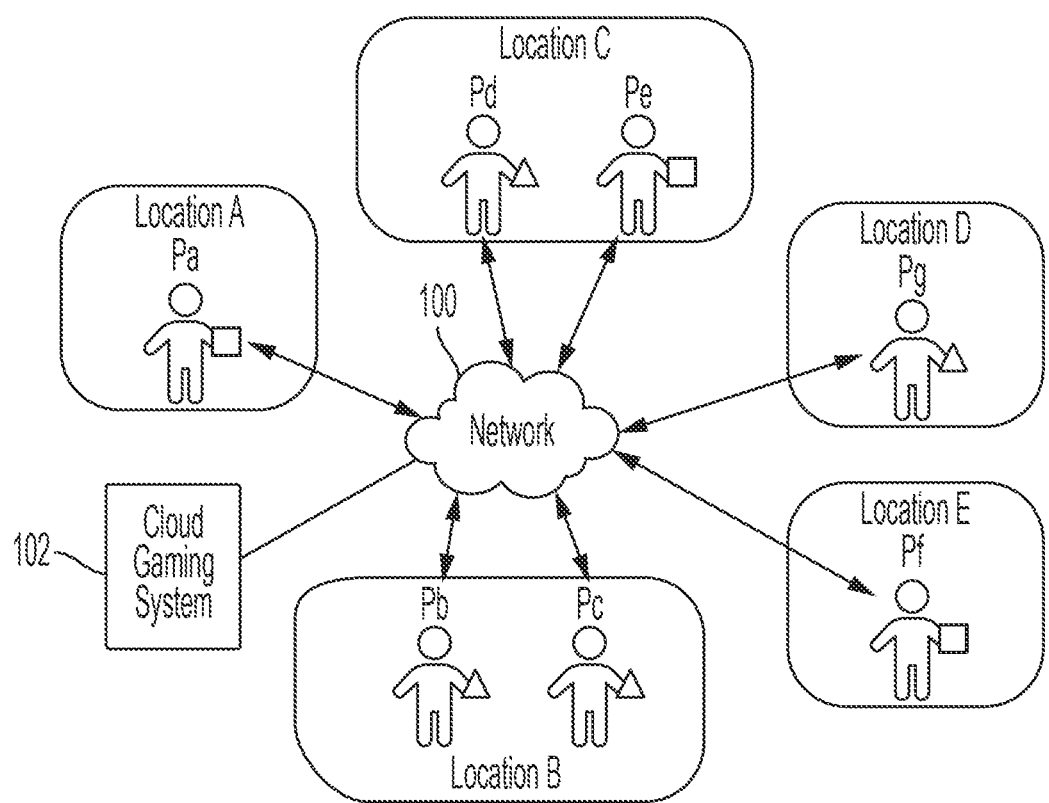
FIG. 1 illustrates an example of a plurality of mobile devices being used by players connected to a network for gaming, in accordance with an implementation of the disclosure.

The following implementations of the present disclosure provide devices, methods, and systems for pre-emptive loss correction for mobile client devices when engaging in online game streaming In the context of game streaming, users of mobile client devices may be connected to a gaming server during a gaming session when game streaming is taking place. As noted above, a challenge of using mobile client devices is that connection quality may change from time to time as users travel around. Sometimes, the connection quality drops because a mobile client device travels away from a cell station and sometimes because the user's wireless space is blocked. For instance, mobile client devices may be entering a tunnel, crossing a bridge, entering a parking structure, entering a high rise building, roaming in the country, or just generally moving to where connection signals are weak or non-existent.

Although this is expected that connection quality will vary or drop altogether, the impact on a streaming gaming session can be significant. For instance, a player may lose during an important part of the game, the game may freeze and allow an opponent to win the session, the game may not count scoring points just attained, and other consequences.

In one embodiment, the streaming clients may be configured to provide data, e.g., geolocation data (e.g. GPS), other location indicators and/or route information to the gaming server. This data, in one embodiment, can be used to build/crowdsource a data loss map. The data loss map can be used by a predictive data loss engine, which is configured generate pre-emptive actions. These pre-emptive actions can include, for example, notifications to game streaming servers to pre-emptively send to mobile client devices gaming data for caching. In this way, mobile devices can continue to play or take certain actions in a caching mode and then later when the connection returns back to a live streaming mode. The pre-emptive actions can also include notifications to be sent to the servers and/or the mobile client devices.

The notifications can include recommended actions that the servers can take or actions that users of the mobile client devices can take in advance of anticipated connection degradation or loss. The pre-emptive actions can also include predictive game state saves. For example, the game streaming servers can be configured to initiate mid-gaming saves of game states (e.g., before a normal game save state point) pre-emptively before a predicted data loss event occurs. In some embodiments, before entering a poor connection area the streaming client may choose to lower the bandwidth, increase forward error correction, etc. In some embodiments, games could be automatically paused when a connection is lost in a lossy area, etc. In accordance with the embodiments described herein, the client location information may be processed client side or server side.

In one embodiment, a method for processing pre-emptive loss correction is described. The method includes receiving, by a server, data loss from a plurality of mobile client devices. The data loss is used to construct a data loss map that indicates connection quality between said plurality of client devices to the server. The connection quality identifies geolocation data for said plurality of client devices for constructing and updating said data loss map. The method includes receiving, by the server, navigation data for a mobile client device while streaming gameplay from the server. The navigation data is used to identify a route of travel for said mobile client device. The method includes identifying, by the server, a predicted data loss event for the mobile device client. The predicted data loss event is identified using the data loss map and tracking movement of said mobile device client along the route of travel. The method includes sending, by the server, notification data for the pre-emptive data loss event to the mobile client device. The notification data used for adjusting activity of said gameplay at the mobile client device before reaching a geo-location associated with the predicted data loss event.

It will be obvious, however, to one skilled in the art that the present disclosure may be practiced without some or all of the specific details presently described. In other instances, well known process operations have not been described in detail in order not to unnecessarily obscure the present disclosure. With the above overview in mind, the following provides several example figures to facilitate understanding of the example embodiments.

FIG. 1 illustrates an example of a plurality of mobile devices being used by players Pa, Pb, Pc, Pd, Pe, Pf, and Pg. The players are shown to be holding mobile client devices and connected to a network 100. The network 100 is configured to provide access to a cloud gaming system 102. The players are also shown at different locations A-E. In accordance with some embodiments, the players a-g may be moving around from location to location during their normal day of gaming In some cases, the players may be walking around, riding around as passengers in vehicles, riding a train, riding a trolley car, moving in an elevator, moving on an escalator, standing on a moving sidewalk, etc. Generally, users of mobile client devices may connect to online servers, e.g., the cloud gaming system while moving from place to place.

As the players move from place to place, the players may be engaging in online streaming of their gaming. As is typical, during a gaming session, players may engage in specific types of gaming actions. Some gaming actions may involve more interactive inputs and actions, while other gaming actions may involve fewer interactive inputs. By way of example, if the game is a first person shooter game, the player may be moving around the game world looking for targets or game tasks. As the user moves his or her character around the game world, the interactivity may be minimal. However at some point, the player may be engaged in a combat maneuver with another player to achieve or gain points. During this engagement, the interactive gameplay is more intense. Accordingly, it would be understood that as players move about using their mobile client devices, bandwidth conductivity is important. It is even more important when the user is engaged in more intense interactivity, where a loss of connection or connection quality could be detrimental to the user's advancement in the game.

Figure 2:
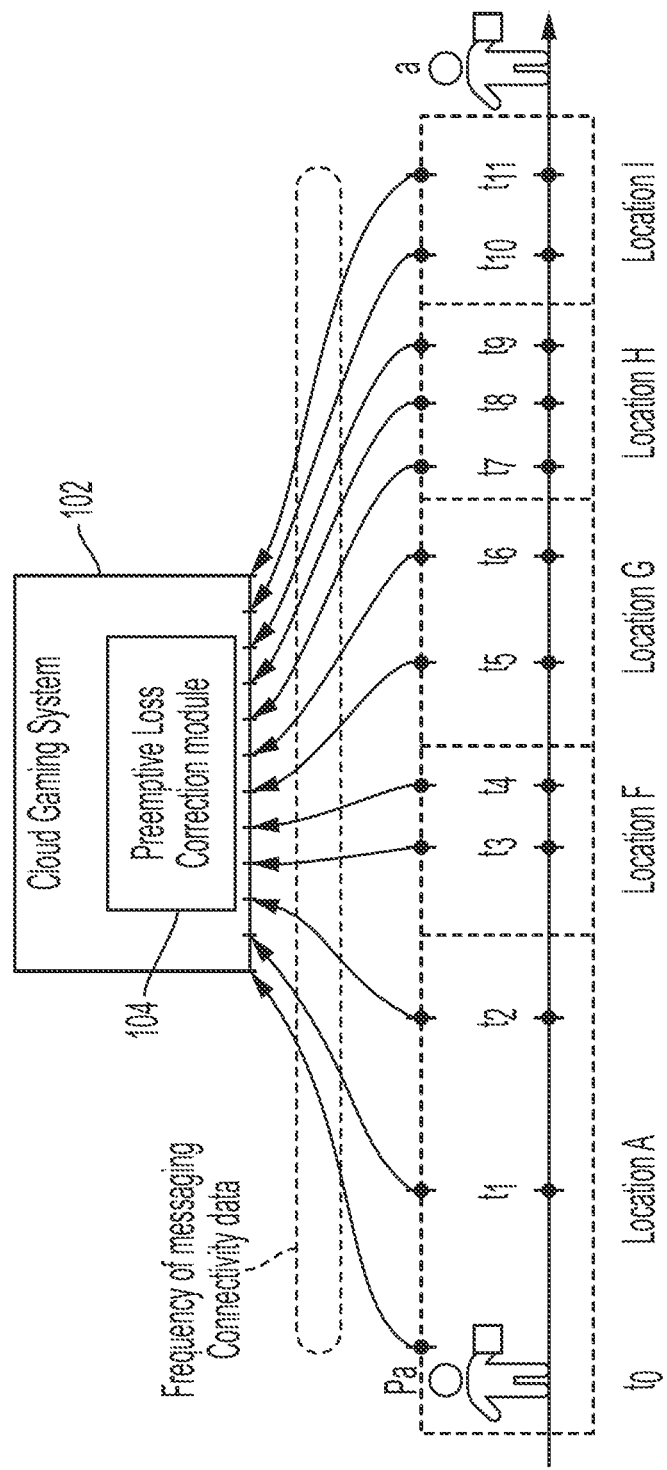
FIG. 2 includes a cloud gaming system configured to include a preemptive loss correction module, in accordance with an implementation of the disclosure.

FIG. 2 includes a cloud gaming system 102 configured to include a preemptive loss correction module 104. The pre-emptive loss correction module 104 is executed by one or more servers of the cloud gaming system 102. In operation, the preemptive loss correction module 104 is configured to monitor any data loss and connection quality between mobile client devices and the server providing the game streaming. Over time, this information can be gathered as a form of crowd sourced data collection. This information regarding data loss and/or connection quality can be tracked using a data loss map. The data loss map can then be used by the cloud gaming system 102 in order to preemptively provide feedback to mobile client devices as they traverse from location to location.

The illustration of FIG. 2 shows a player Pa traversing from location to location. The player Pa may be walking, riding in a car, writing in a train, or generally moving from location A to location I. During this movement, player Pa will be connected to the cloud gaming system 102 during a gaming session. During the gaming session, the player Pa may be providing information to the preemptive loss correction module 104 regarding the level of conductivity between the player and the server providing the streaming of gameplay. The connectivity can include, for example, information regarding any data loss experienced during the movement from location to location and connection quality.

For instance, sometimes the connection would just be reduced when the player moves too far from a local cell tower. In other circumstances, the connection would be an actual data loss, such as when the player enters a tunnel, or structure, or location that is too far to provide wireless data to the mobile client device of the player. In the illustration of FIG. 2, the player Pa is shown walking from time t1, t2, t3, t4, t5, t6, t7, t8, t9, t10, t11, etc. It should be understood that the number of times the player Pa via the mobile device provides conductivity data back to the cloud gaming system 102 can vary. For example, the frequency of messaging data sent back to the cloud gaming system 102 can be in intervals of every 200 milliseconds, or intervals of every 500 milliseconds, or intervals of every second, or intervals of every other second, or once every minute, or once every few minutes.

In one embodiment, the frequency of messaging data back to the cloud gaming system 102 will be at least once every two minutes, in order to have sufficient data correlated to the movement of the mobile client device. In some cases, the frequency of messaging back to the cloud gaming system 102 will be once every 30 seconds. The frequency of messaging back to the cloud gaming system 102 can be dynamically adjusted based on the speed at which the mobile client device is detected to be moving, e.g., using GPS.

For example, if the user is riding on a fast train, the frequency of messaging should be shortened, in order to provide more accurate conductivity information based on the geolocation being traversed. If the user is simply walking along the sidewalk, the frequency of messaging can be increased, since the changes in geolocation being traversed will be minimal. The adjusting of the frequency of messaging can be made by the cloud gaming system 102 in conjunction with the preemptive loss correction module 104. In some embodiments, the frequency of messaging can also be controlled by the client device.

Figure 3:
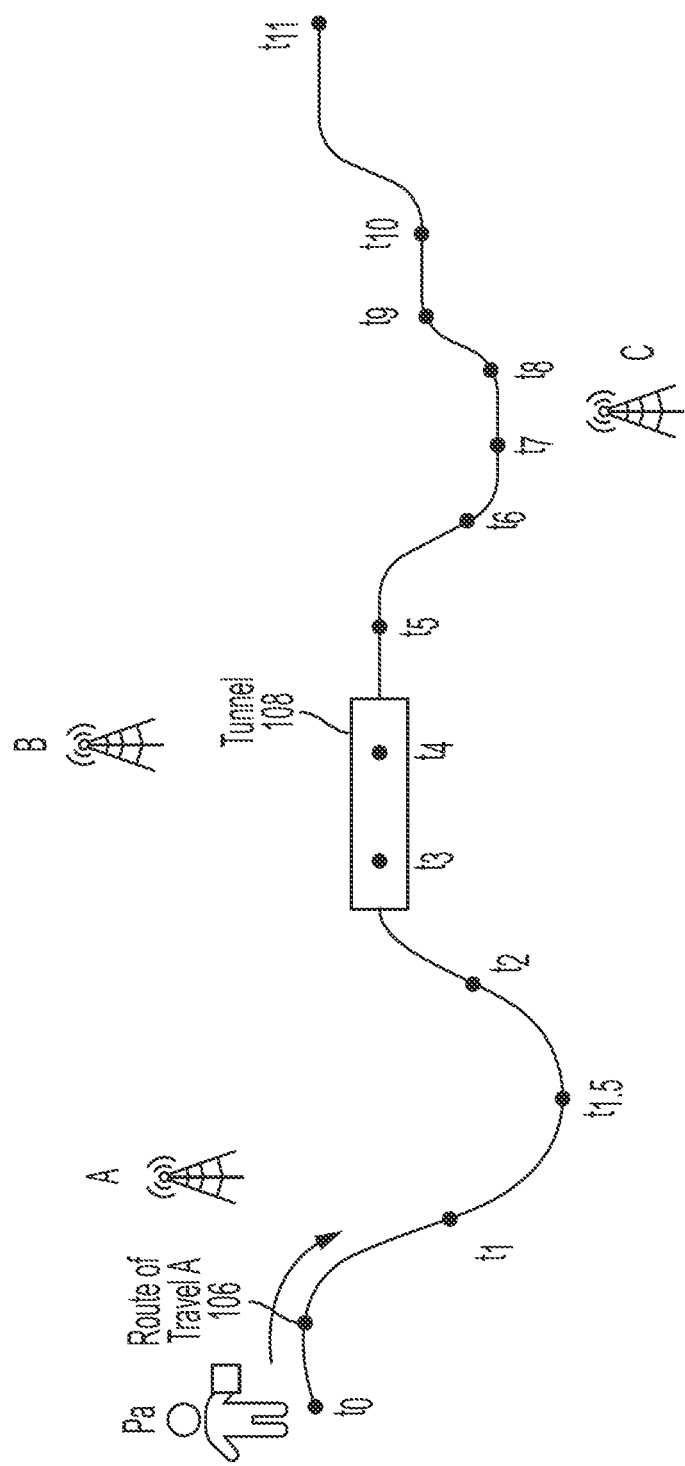
FIG. 3 illustrates an example of player Pa moving about a route of travel, and during the travel sending sufficient conductivity information messages back to the server of the cloud gaming system in order to construct information usable for forming a data loss map, in accordance with an implementation of the disclosure.

FIG. 3 illustrates an example of player Pa moving about a route of travel A, and during the travel sending sufficient conductivity information messages back to the server of the cloud gaming system 102 in order to construct information usable for forming a data loss map. In this example, several cellular towers A, B, and C are shown along the route of travel A. As the player Pa moves along the route of travel A, the mobile client device of the player Pa will experience different connection qualities in the signals received between the different towers along the route. This example shows the player Pa moving along the route and entering a tunnel 108. During when the player Pa is in the tunnel 108, data loss will be experienced by the player Pa. When the player Pa exits the tunnel 108, the connection will return.

However, as the player Pa moves about the route of travel A, messaging back to the cloud gaming system 102 will provide information regarding the connectivity quality being experienced by the mobile client device of player Pa, while the player is playing a game. In this case, if the player Pa was playing a game and engaged in interactive activity before entering the tunnel 108, the player Pa would have experienced data loss, and possibly ruined part of the game experience.

Figure 4:
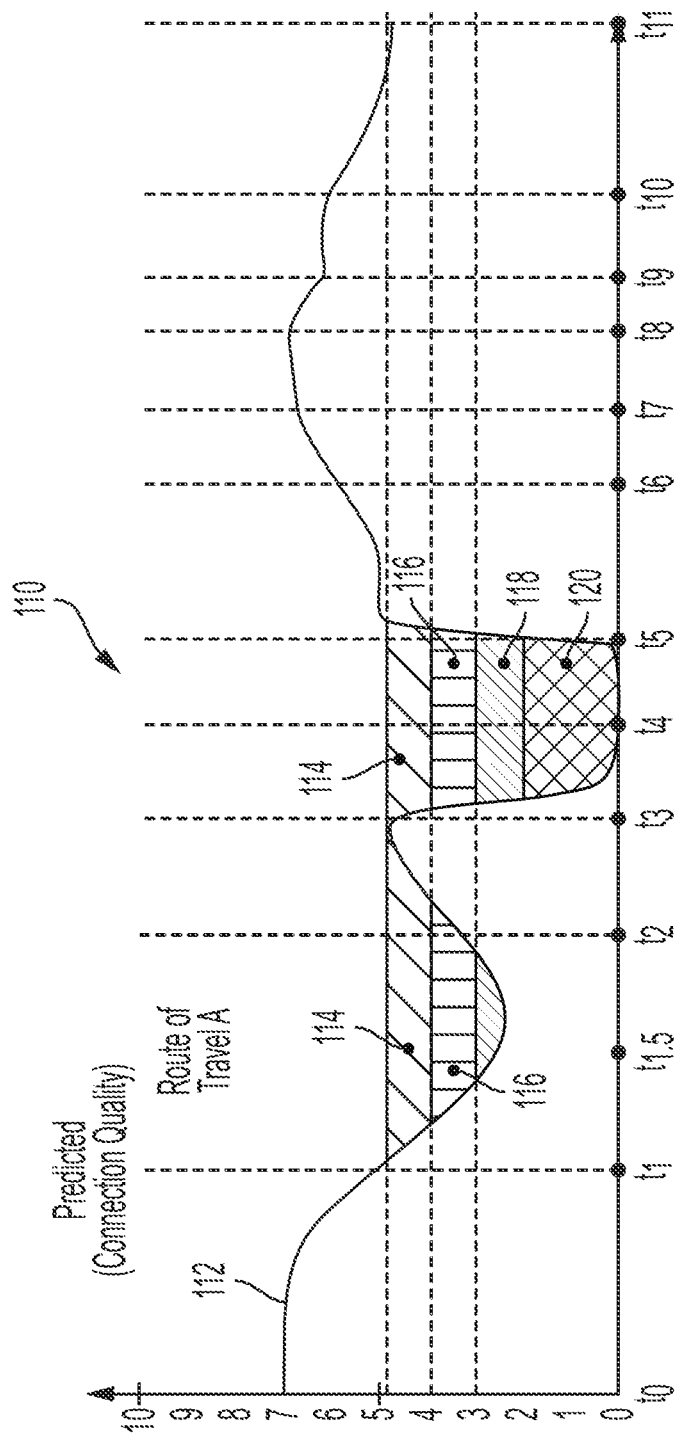
FIG. 4 illustrates an example of a predicted connection quality, for a given route of travel A, in accordance with an implementation of the disclosure.

FIG. 4 illustrates an example of a predicted connection quality 112, for a given route of travel A. This predicted connection quality 112 was obtained from a data loss map that was constructed by collecting connection quality information from a plurality of other players that may have traveled this route earlier. In one embodiment, the predicted connection quality 112 can be updated dynamically over time as more and more data is received regarding the connection quality as users traverse this route of travel.

By way of example, the predicted connection quality is shown on a scale of 0 to 10, where 0 is no data connection and 10 is excellent conductivity. For purposes of example only, it is shown that the predicted connection quality 112 is at about 7 at time t0, and drops to about 5 at time t1. With reference to FIG. 3, it is shown that for the route of travel A, at time t1, the cell tower A is further from the mobile device of the player. At time t1.5, the connection quality drops from a medium connection quality 114 to a lower connection quality 116, and to a below normal connection quality 118. Based on the predicted connection quality 112, as collected over time from many other mobile device users traversing route of travel A, it is shown that the predicted connection quality 112 will drop completely below unstable 120, and essentially provide for a connection quality of 0. With reference to FIG. 3, it is shown that during this time the route of travel A is corresponding to the tunnel 108.

Once past the tunnel 108, the connection quality ramps up to a usable and efficient level for interactive gameplay between the mobile device and the cloud gaming system 102. It should be understood that the reference to time in the illustrated timescales would be adjusted in scale based on the speed that a particular user is traversing a geolocation along a specific route of travel. That is to say, some players may be moving at a faster rate in a vehicle or a train, and thus the amount of time in the tunnel 108 will be shorter, relative to a player walking into a tunnel.

As described above, the predicted connection quality 112 can be dynamically constructed and adjusted over time based on data received from mobile devices to form a data loss map. The data loss map can then be used for predictive purposes and provide feedback to players before they enter or reach locations where connectivity will drop or be impacted. In this manner, notifications, predictive game state saves, and other recommended actions can be processed preemptively before a mobile device user that is playing a game in streaming mode reaches geo-locations where conductivity is expected to be degraded or lost.

Figure 5:
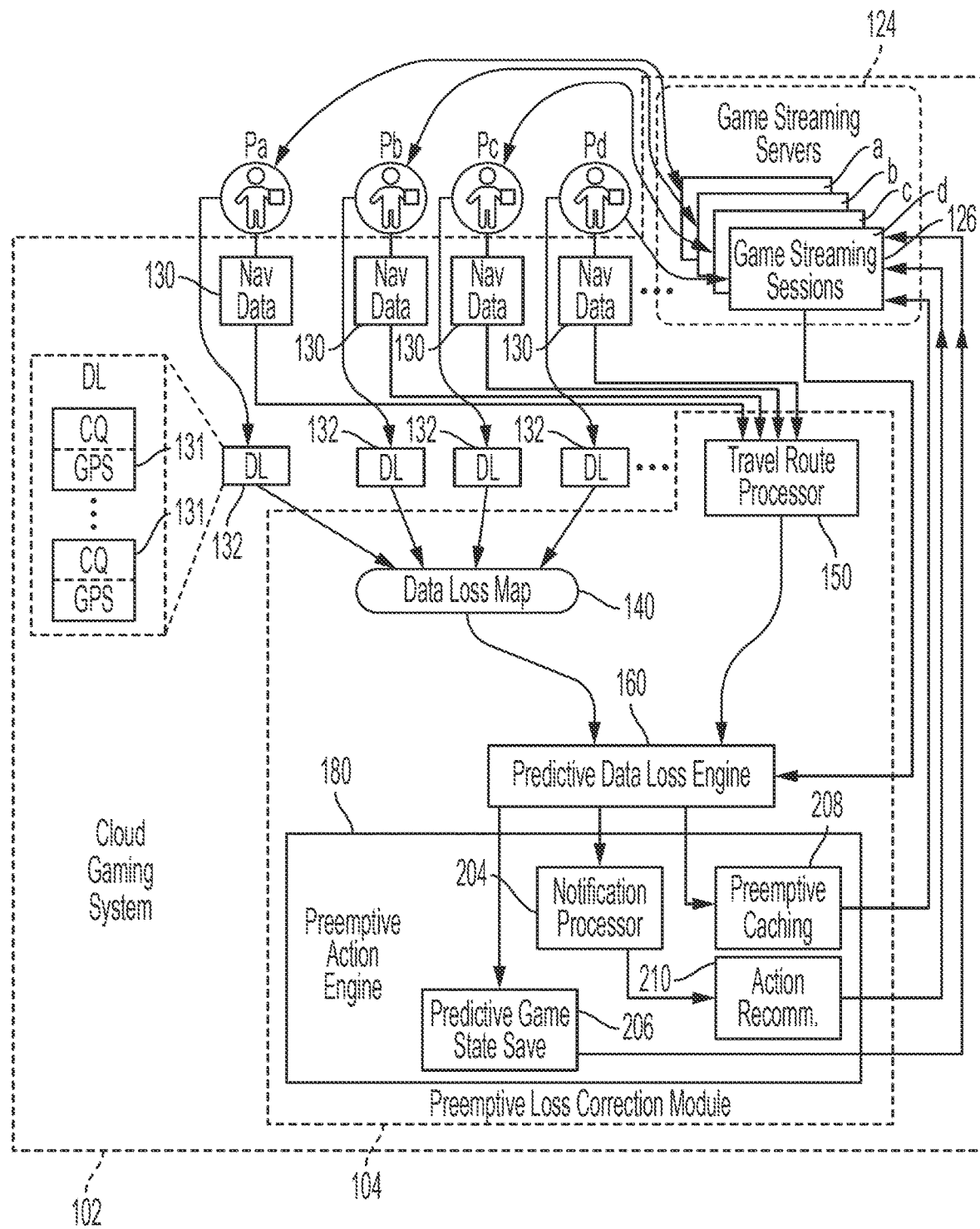
FIG. 5 illustrates an example of the cloud gaming system including the preemptive loss correction module, in accordance with one embodiment.

FIG. 5 illustrates an example of the cloud gaming system 102 including the preemptive loss correction module 104, in accordance with one embodiment. As shown, the plurality of players Pa-Pd, at different points in time can be playing in streaming video games from the cloud gaming system 102 utilizing game streaming servers 124. The game streaming servers 124 can be executing corresponding game streaming sessions a-d, for the players Pa-Pd. During the game streaming, the mobile client devices of the players may be moving around to different geolocations and different routes.

Over time, as more and more players navigate different geolocations, those players will be providing data loss (DL) information 132 and navigation (NAV) data 130. In some embodiments, the data loss information 132 can include various messages 131 of connection quality, and associated GPS information for those messages 131. Over time, this information is received by the preemptive loss correction module 104, which stores and updates a data loss map 140. A travel route processor 150, in accordance with one embodiment, receives the navigation data 130. The navigation data 130 can include explicit route information provided by the player or a related device. For instance, a player may have looked up a destination address in a mapping application, and generated a route. This route could be provided in the navigation data 130 to the route travel processor 150.

In some embodiments, the player may not provide explicit routing information, but the user's usual plans or schedule may provide indicators for predicting the route to be taken by the player. In some embodiments, the route taken by the player may be a common route taken at a specific time of day, and thus form the basis for a predicted route taken or to be taken by specific users. In some embodiments, the player's profile can be accessed to determine location information that was approved by the player for conducting predictions, in order to provide preemptive data loss connection actions.

The preemptive loss connection module 104 further includes a predictive data loss engine 160 that receives information from the data loss map 140 and the travel route processor 150. The predictive data loss prediction engine 160, in one embodiment, is used to determine what type of information should be preemptively generated and sent back to the players in order to avoid data loss during the gaming activities. For example, if the predictive data loss engine 160 determines that a specific player is about to enter a data loss location, e.g. the tunnel 108, the predictive data loss engine 160 can provide information to a preemptive action engine 184 facilitating the transmission of control data to the game streaming sessions being processed by the game streaming servers 124.

By way of example, if it appears that a specific player is entering a region or geolocation where loss is anticipated to occur, the predictive data loss engine 160 can be configured to trigger that the preemptive action engine 180 send control data to the game streaming sessions. The control data can include information that can be communicated to the players in the form of messages, recommendations, or other types of warnings of anticipated data loss along a route of travel that is up ahead for the player. In some embodiments, the control data can be automatically executed by the game streaming session 126 and associated game streaming servers 124. This automatic execution can include, for example predictive game state saves 206 that caused the game streaming servers to make a save point at a location that is not normally a save point, before the data loss is experienced.

The preemptive action engine 180 is shown to include a notification processor 204, a predictive game state save 206, preemptive caching 208, and action recommendations 210. In one embodiment, based on information received from the predictive data loss engine 160, the notification processor 204 can determine what type of action recommendation 210 will be generated. The action recommendation 210 can be a passive action, such as information provided to the player. This information can recommend that the player save their game state, adjust their quality setting, or pause their game, or some other notification. The action recommendation 210, can be more of an active action. The active action can be information or code sent back to the game streaming session 126 of the player so that the game streaming server 124 can take automatic action.

This automatic action can include, for example, instructions for lowering the bandwidth of gameplay, increasing forward error correction (FEC), or making other adjustments to compression, or other performance adjustments made by one or more processes running at the game streaming servers 124. The predictive game state save 206 may include generating instructions sent back to the game streaming sessions 126 and game streaming servers 124. These instructions may include commands to generate a save point in the game session, in anticipation of data loss. For example, the server may automatically save the user's game state predictively before entering the data loss region or geolocation. As will be described below, when to save the game state predictively or pause the game may depend on the actions being taken in the game.

For instance, if the user is actively engaged in a battle during the game, the predictive game state save 206 can be triggered at a time after the battle, but before a next battle occurs. Triggering the predictive game state save may include, saving the game state and not allowing the user to begin the next battle because the next battle would occur during a data loss timeframe. A notification to the user can be provided indicating that the game state is being saved and the user should wait until the data loss that is anticipated up ahead along the route of travel ends. In another embodiment, the predictive data loss engine 160 can also trigger preemptive caching 208.

Preemptive caching can include, for example, instructing the game streaming servers 124 to download to the client mobile device a portion of the game. The portion of the game can include executable code that can be run on the game without the mobile device having Internet connection. Once the connection is restored, the advancements made utilizing the preemptive caching can be uploaded back to the game streaming servers 124, to then allow the gaming to continue. In some embodiments, if the data loss is relatively short, e.g. less than 5 minutes, the preemptive caching can allow the user to continue playing without Internet connection for some game tasks, and then resume to live play once the connection is restored along the path of travel.

Figure 6:
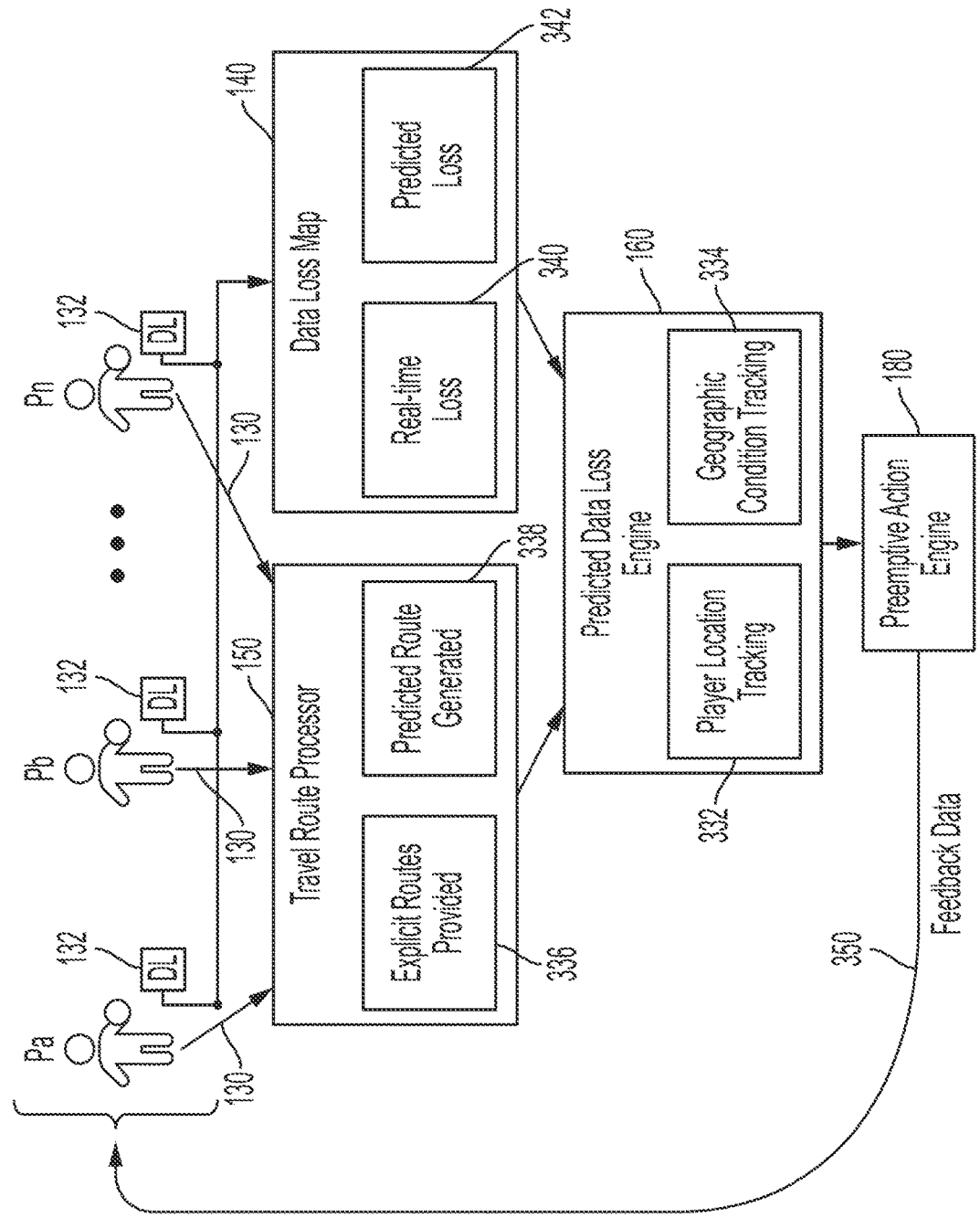
FIG. 6 illustrates an example of players Pa-Pn, which generate data loss information and provides navigation data to the preemptive loss connection module, in accordance with one embodiment.

FIG. 6 illustrates an example of players Pa-Pn, that are generating data loss information 132 and also providing navigation data 130 to the preemptive loss connection module 104, in accordance with one embodiment. As mentioned above, as multiple players play different games and traverse different geolocations, the data loss map will become more accurate of anticipated data loss regions. In addition, as those players move about different geolocations, those players will also benefit from prior players that have traversed the same or similar paths of travel through those geolocations having data loss issues.

For this reason, players are considered providers of crowd sourced information for data loss back to the server of the cloud gaming system 102 as well as receivers of feedback of data loss that is predicted to occur along paths of travel. As shown, the travel route processor 150 includes information regarding explicit routes provided 336 and predicted routes generated 338. Explicit routes provided 336 can include information that can be inputted by players into their mobile devices or other geolocation devices that they may be interacting with or traveling with. For instance, if a player is traveling in a vehicle with a geolocation map and destination, that information can be shared to the mobile device as well. In other embodiments, the predicted route generated 338 can include information obtained from the players profile or user account.

This information can be collected if the player allows location data to be accessed for purposes of providing preemptive loss correction information. In one embodiment, the predicted route generator 338 can gather information regarding the user's travel patterns, geolocations traversed, historical movements, and predicted routes taken at specific times of day, times of year, and other variables. In one embodiment, machine learning can be utilized to optimize the prediction to be taken by the player at specific times.

The data loss map 140 can be constructed and updated dynamically based on data loss information received from the various players over time. As mentioned above, the data loss map includes connection quality drops, connection quality increases, connection quality interruptions, complete drops of connection, sporadic connection quality signals, unstable connection indicators, and the like. As different players move around the different geolocations, this information regarding data loss and associated connection quality can be processed by a real time loss processor 340.

The real time loss processor 340 can associate information regarding loss received by different mobile devices at different geolocations, for specific times of day. The data loss map 140 can also process information regarding predicted loss 342. Predicted loss 342 can be generated based on machine learning models that identify when losses occur at specific locations or specific times. This prediction can be reinforced over time based on information received from various players that are traversing the different geolocations over time. Accordingly, the more crowdsourcing of information regarding connection quality that is received by the data loss map 140, the more the system is able to predict loss 342. The data loss map 140 will therefore include information regarding where losses are occurring at different geolocations, as well as predictions as to where losses may occur.

Predicted data loss engine 160, as mentioned above, will utilize inputs from the travel route processor 150 and the data loss map 140. The predicted data loss engine 160 may also include a player location tracking processor 332 and a geolocation condition tracking processor 334. The player location tracking processor 332 is configured to track movements of different client mobile devices when connected to the cloud gaming system 102. Player location tracking 332 enables the generation of connection quality metrics for different locations being traversed by specific players.

As mentioned above, as players move around to different geolocations, the mobile client devices can be configured to send messages back to the server indicating connection quality for specific geolocations. In addition, the predicted data loss engine 160 can also access other data sources that may provide information regarding geographic conditions for geographic condition tracking 334. The geographic conditions can include information regarding roadblocks, roadwork, closed roads, emergencies, and other information that will affect a specific route. By understanding the geographic conditions, it is possible to predict changes in routes that may occur and associated data loss for those routes. This information allows the predicted data loss engine 160 to make updates to the predictions of when a loss is anticipated to occur for specific players at specific times and for specific locations.

The predicted data loss engine 160 will therefore provide instructions to the preemptive action engine 180 that can then send feedback data 350 to the game streaming servers 124 that are providing the game streaming to the players Pa-Pn.

Figure 7:
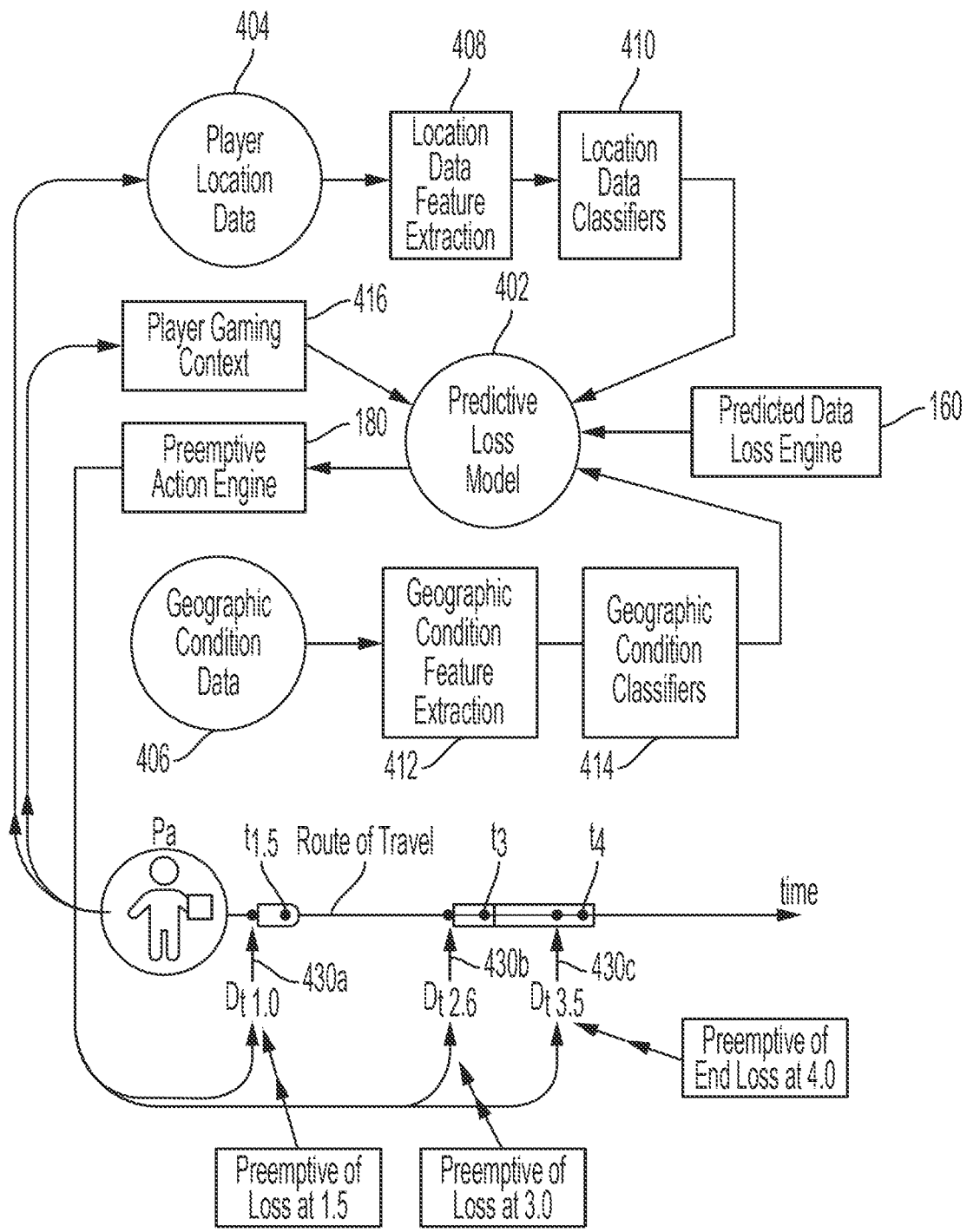
FIG. 7 illustrates an example of using a predicted loss model for determining when to generate instructions for preemptive loss correction, in accordance with one embodiment.

FIG. 7 illustrates an example of using a predicted loss model 402 for determining when to generate instructions for preemptive loss correction, in accordance with one embodiment. As shown, the predictive loss model 402 receives inputs from player location data 404 and geographic condition data 406. In this embodiment, the player location data can be processed in operation 408 to extract features regarding the location data. The features can include GPS data that is indicative of where the player may be located when streaming a game. Location data classifiers 410 can then process the location data features that were extracted in order to feed classified location data to the predictive loss model 402. The geographic condition data 406 can also be processed to extract features regarding the geographic conditions.

As mentioned above, the geographic conditions can include road closures, cell tower malfunctions, cell tower repairs, rerouting for road conditions, and the like. The geographic conditions can then be processed by a feature extractor to identify relevant features associated with the different conditions that were identified. Generally speaking, the geographic conditions are those that are being received for areas in which different players may be located when playing games and connected to the cloud gaming system 102. The geographic conditions are therefore obtained responsive to the crowd sourced information that is being received regarding data loss from the predicted data loss engine 160. As mentioned above, the predicted data loss engine 160 will also be receiving information regarding the data loss map 140 and the travel route processor 150. In this manner, the predictive loss model 402 can be utilized to generate preemptive actions by preemptive action engine 180 that are communicated to the mobile devices of the players, in advance of the data loss. As shown, player Pa is shown playing a streaming game from the cloud gaming system 102.

During this gameplay, the player Pa location data 404 understands where the player is located, and the predictive loss model 402 receives the data loss map 140 via the predicted data loss engine 160, for the player Pa. As shown, the preemptive action engine 180 is configured to send out preemptive instructions to the player's Pa mobile client device. In this simple example, data loss or connection quality is expected at time t1.5, as shown in FIG. 4. Thus, the preemptive action sent to the client device would be sent at a time t1.0, before the predicted data loss. In this manner, the client device can perform a save operation, or increase the forward error correction, or lower the bandwidth. As further shown in FIG. 7, the predictive loss model 402 can also predict to send the preemptive action at time t2.6, which is before time t3.0, when data loss is expected and predicted to occur completely for a period of time that last up to time t4. In one embodiment, the predicted loss model 402 will also understand that the loss will stop at time t4, so a predictive action can be sent to the client device to prepare the client device to resume play just after time t4.

Figure 8:
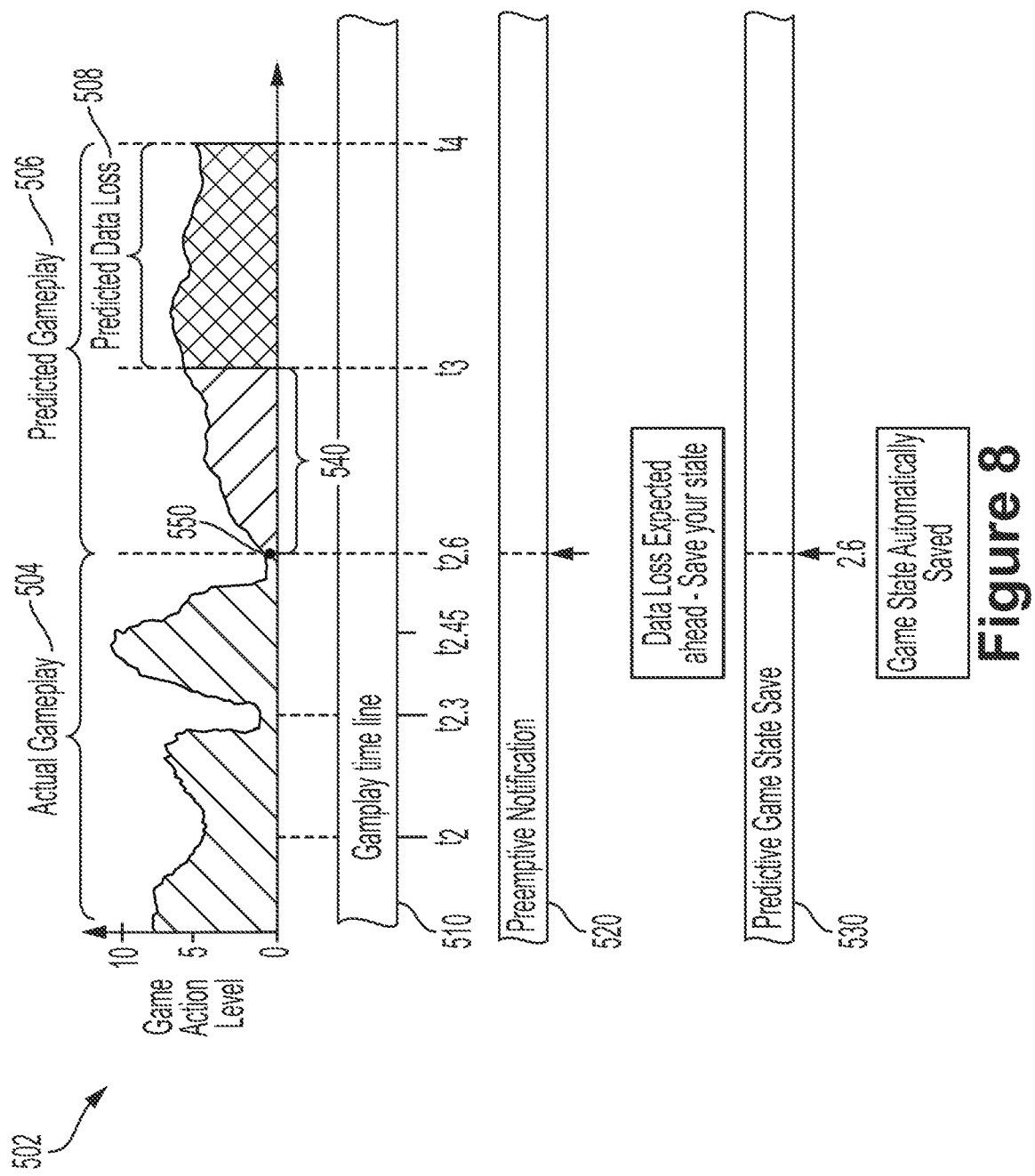
FIG. 8 illustrates an example of gameplay by a player Pa, in accordance with one embodiment.

FIG. 8 illustrates an example of gameplay by a player Pa, in accordance with one example. This illustration shows game action levels spanning from 0 to 10, where level 0 is no game action, and level 10 is extreme game action. For instance, if the user is immersed in detailed inputs and controls for maneuvering during a boss fight, those game actions can be elevated nearing level 10. If the user is simply walking around the game world looking for the next activity, that type of low-level interactivity can be ranked closer to level 1. As can be expected, the game action level will change continuously depending on what is going on in the game during gameplay 510.

The actual gameplay 504 of the player Pa is shown in graph 502. Graph 502 shows that the player had low game action levels at time t2.3, and then increased at time t2.45. The game action level then starts to decrease at point 550. In one embodiment, the predictive loss model 402 can generate preemptive actions at specific times in anticipation of data loss. In the graph 502, it is shown that predicted gameplay 506 will occur and increase from point 550. However, the predicted gameplay 506 shows that predicted data loss 508 will occur at time t3. The preemptive action engine is configured to intelligently determine when the cause of a notification is to be sent to the player or automatically trigger a save of the game state. The notification can also be sent to the player deposit a game at point 550, before additional predicted gameplay 540 occurs, since it is predicted that data loss will occur at time t3.

In one embodiment, a predicted data loss event is validated using a continuous verifying process. This process uses the tracking of the mobile client device along the route of travel, and processes a status of data loss from the data loss map. The continuous verifying process produces certainty indicators that are processed to determine when a certainty threshold is triggered. When the certainty threshold is triggered the notification data for the pre-emptive data loss event is sent to the mobile client device. In one example, the certainty indicators can be generated based on the context of the game action levels. Further, if the outsourced data is sufficiently strong regarding data loss a specific region or area, the certainty indicators are adjusted upwards. By way of example, a certainty threshold can be triggered, if the crowd sourced data from the data loss map indicates that greater than 50% of reporting users are finding data loss at a specific geolocation. In some embodiments, the certainty threshold can be adjusted upwards to greater than 75%, to ensure more accuracy in delivering the notification or pre-emptive action.

In one embodiment, the preemptive notification 520 can be sent at a customized time before the predicted data loss 508. In this example, the preemptive notification 520 will be sent at time t2.6. Although the predicted data loss 508 does not occur until time t3.0, the predictive loss model 402 will issue an instruction to generate actions before that occurs at point 550, in order to avoid loss of interactive context during predictive gameplay 540. That is, before the user begins and next battle or next activity in the game, a good safe point would be at time t2.6, since that is a time when the game action level is close to 0. This is beneficial, since the user will not engage in the predictive gameplay that would produce increased game action levels as shown in graph 502 and then abruptly be stopped at time t3 (when the predicted data loss 508 is to occur). In a similar manner, the predictive game state saves 530 can also be triggered automatically at specific times when there are low game action levels, in advance of and preemptively before the predicted data loss 508 occurs.

In some embodiments, the predictive game state saves 530 can also occur just before the predicted data loss 508 happens, even when there are more game action levels occurring. In some embodiments, the player can simply be warned at time t2.6, which is predicted to be sufficient time before the predicted data loss 508 is to occur. The amount of time before such notifications or automatic game state saves are triggered will depend on the movement of the mobile client device, as the speed at which the mobile client device approaches the predicted data loss regions will be taken into consideration by the predictive loss model 402.

Broadly speaking, the embodiments described herein are configured to provide preemptive loss correction options utilizing data loss maps constructed from crowd sourced information received from the various players as they move about the different geolocations during gameplay. In this manner, the preemptive correction routines can assist players in not losing gameplay progress, or loss of inputs. Allowing these preemptive correction measures, the system can allow the players to pause games, save game states, continue playing the game under a caching mode, resume playing games after the connection is restored, and execute one or more these operations with a predictive processing that allows triggering before loss occurs.

Figure 9:
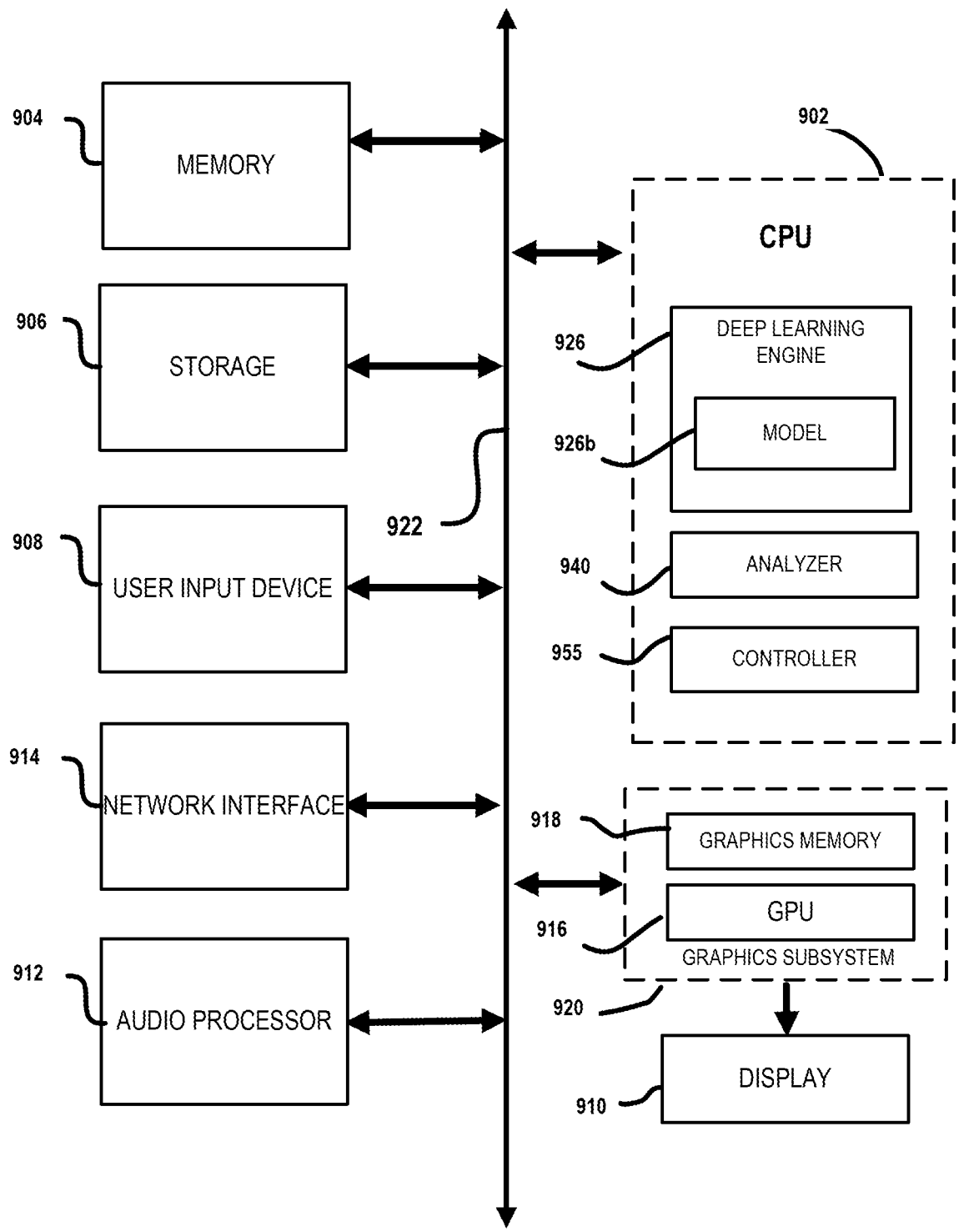
FIG. 9 illustrates components of an example device that can be used to perform aspects of the various embodiments of the present disclosure.

FIG. 9 illustrates components of an example device 900 that can be used to perform aspects of the various embodiments of the present disclosure. This block diagram illustrates a device 900 that can incorporate or can be a personal computer, video game console, personal digital assistant, a server or other digital device, suitable for practicing an embodiment of the disclosure. Device 900 includes a central processing unit (CPU) 902 for running software applications and optionally an operating system. CPU 902 may be comprised of one or more homogeneous or heterogeneous processing cores. For example, CPU 902 is one or more general-purpose microprocessors having one or more processing cores.

Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 900 may be a localized to a player playing a game segment (e.g., game console), or remote from the player (e.g., back-end server processor), or one of many servers using virtualization in a game cloud system for remote streaming of gameplay to clients. In one embodiment, the CPU can also process operations associated with machine learning or deep learning engine 926. In machine learning, models 926b can be processed, as discussed above. An analyzer 940 can also be processed for analyzing operations carried out by the CPU or machine learning processes. A controller 955 may also be provided as part of the CPU for processing one or more operations.

Memory 904 stores applications and data for use by the CPU 902. Storage 906 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 908 communicate user inputs from one or more users to device 900, examples of which may include keyboards, mice, joysticks, touch pads, touch screens, still or video recorders/cameras, tracking devices for recognizing gestures, and/or microphones.

Network interface 914 allows device 900 to communicate with other computer systems via an electronic communications network, and may include wired or wireless communication over local area networks and wide area networks such as the internet. An audio processor 912 is adapted to generate analog or digital audio output from instructions and/or data provided by the CPU 902, memory 904, and/or storage 906. The components of device 900, including CPU 902, memory 904, data storage 906, user input devices 908, network interface 910, and audio processor 912 are connected via one or more data buses 922.

A graphics subsystem 920 is further connected with data bus 922 and the components of the device 900. The graphics subsystem 920 includes a graphics processing unit (GPU) 916 and graphics memory 918. Graphics memory 918 includes a display memory (e.g., a frame buffer) used for storing pixel data for each pixel of an output image. Graphics memory 918 can be integrated in the same device as GPU 908, connected as a separate device with GPU 916, and/or implemented within memory 904. Pixel data can be provided to graphics memory 918 directly from the CPU 902. Alternatively, CPU 902 provides the GPU 916 with data and/or instructions defining the desired output images, from which the GPU 916 generates the pixel data of one or more output images. The data and/or instructions defining the desired output images can be stored in memory 904 and/or graphics memory 918. In an embodiment, the GPU 916 includes 3D rendering capabilities for generating pixel data for output images from instructions and data defining the geometry, lighting, shading, texturing, motion, and/or camera parameters for a scene. The GPU 916 can further include one or more programmable execution units capable of executing shader programs.

The graphics subsystem 914 periodically outputs pixel data for an image from graphics memory 918 to be displayed on display device 910. Display device 910 can be any device capable of displaying visual information in response to a signal from the device 900, including CRT, LCD, plasma, and OLED displays. Device 900 can provide the display device 910 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising,
    receiving, by a server, data loss from a plurality of mobile client devices, the data loss used to construct a data loss map that indicates connection quality between said plurality of mobile client devices to the server, the connection quality identifying geolocation data for said plurality of mobile client devices for constructing and updating said data loss map;
    receiving, by the server, navigation data for a mobile client device while streaming gameplay from the server, the navigation data being used to identify a route of travel for said mobile client device;
    identifying, by the server, a predicted data loss event for the mobile device client, the predicted data loss event being identified using the data loss map and tracking movement of said mobile device client along the route of travel;
    sending, by the server, a notification data for the predicted data loss event to the mobile client device, the notification data used for adjusting activity of said gameplay at the mobile client device before reaching a geolocation associated with the predicted data loss event;
    wherein said notification data is sent for a time before the predicted data loss event occurs, and the time before the predicted data loss event occurs is correlated to a time of reduced level of game action.

2. The method of claim 1, wherein the notification data is processed by the mobile client to provide a warning to a user of the mobile client device to make a change to said streaming gameplay to avoid data loss.

3. The method of claim 2, wherein the change to said streaming gameplay includes saving a game state before loss of connection.

4. The method of claim 2, wherein the change to said streaming gameplay includes reducing a bandwidth of a connection between the server and the mobile device client.

5. The method of claim 2, wherein the change to said streaming gameplay includes increasing forward error correction for data received from said server during said streaming gameplay.

6. The method of claim 2, wherein the change to said streaming gameplay includes pausing said gameplay if said data loss is a complete loss in connection between the server and the mobile client device.

7. The method of claim 6, further comprising,
detecting said pausing of said streaming gameplay; and
automatically providing an option to view pre-cached content stored in memory of the mobile client device while the streaming gameplay is paused.

8. The method of claim 1, wherein the data loss map is configured for updates dynamically as changes in said data loss is received from said plurality of mobile client devices over time.

9. The method of claim 1, wherein the navigation data includes predefined navigation information for a trip and global positioning system (GPS) data for the mobile client device, such that the navigation data is used to identify said route of travel of the mobile client device.

10. The method of claim 1, wherein the predicted data loss event is validated using a continuous verifying process that,
processes the tracking of the mobile client device along the route of travel, and
processes a status of data loss from the data loss map;
wherein the continuous verifying process produces certainty indicators that are processed to determine when a certainty threshold is triggered, wherein when the certainty threshold is triggered the notification data for the predicted data loss event is sent to the mobile client device.

11. The method of claim 1, wherein the notification for the predicted data loss event includes active control data to cause a game server to save state data and pause the gameplay.

12. The method of claim 1, the time before the predicted data loss event occurs is correlated to a speed of travel of the mobile client device moving toward a geolocation where the predicted data loss event occurs.

13. The method of claim 1, wherein said plurality of mobile client devices are configured to send periodic messages to the server indicative of said connection quality, and wherein said periodic messages include geolocation for constructing and updating said data loss map.

14. Non-transitory computer readable media having program instructions for processing predicted data loss events, the computer readable media comprising, program instructions for receiving, by a server, data loss from a plurality of mobile client devices, the data loss used to construct a data loss map that indicates connection quality between said plurality of mobile client devices to the server, the connection quality identifying geolocation data for said plurality of mobile client devices for constructing and updating said data loss map;

program instructions for receiving, by the server, navigation data for a mobile client device while streaming gameplay from the server, the navigation data being used to identify a route of travel for said mobile client device;

program instructions for identifying, by the server, a predicted data loss event for the mobile device client, the predicted data loss event being identified using the data loss map and tracking movement of said mobile device client along the route of travel;

program instructions for sending, by the server, a notification data for the predicted data loss event to the mobile client device, the notification data used for adjusting activity of said gameplay at the mobile client device before reaching a geo-location associated with the predicted data loss event;

wherein said notification data is sent for a time before the predicted data loss event occurs, and the time before the predicted data loss event occurs is correlated to a time of reduced level of game action.

15. The computer readable media of claim 14, wherein the notification data is processed by the mobile client device to provide a warning to a user of the mobile client device to make a change to said streaming gameplay to avoid data loss.

16. The computer readable media of claim 15, wherein the change to said streaming gameplay includes saving a game state before loss of connection.

17. The computer readable media of claim 15, wherein the change to said streaming gameplay includes reducing a bandwidth of a connection between the server and the mobile device client.

18. The computer readable media of claim 15, wherein the change to said streaming gameplay includes increasing forward error correction for data received from said server during said streaming gameplay.

19. The computer readable media of claim 14, wherein the predicted data loss event is validated using a continuous verifying process that includes,
program instructions for processing the tracking of the mobile client device along the route of travel, and
program instructions for processing a status of data loss from the data loss map, wherein the continuous verifying process produces certainty indicators that are processed to determine when a certainty threshold is triggered, wherein when the certainty threshold is triggered the notification data for the predicted data loss event is sent to the mobile client device.

* * * * *